(12) United States Patent
Fukano et al.

(10) Patent No.: US 9,163,744 B2
(45) Date of Patent: Oct. 20, 2015

(54) SOLENOID VALVE

(75) Inventors: Yoshihiro Fukano, Moriya (JP);
Masami Yoshida, Ryugasaki (JP);
Takeshi Karibe, Joso (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 13/807,771

(22) PCT Filed: Jun. 22, 2011

(86) PCT No.: PCT/JP2011/064273
§ 371 (c)(1),
(2), (4) Date: Dec. 31, 2012

(87) PCT Pub. No.: WO2012/002220
PCT Pub. Date: Jan. 5, 2012

(65) Prior Publication Data
US 2013/0099146 A1    Apr. 25, 2013

(30) Foreign Application Priority Data

Jul. 1, 2010 (JP) ................................. 2010-150879
May 26, 2011 (JP) ................................. 2011-117718

(51) Int. Cl.
*F16K 31/02* (2006.01)
*F16K 31/06* (2006.01)
*H01F 7/128* (2006.01)

(52) U.S. Cl.
CPC .............. *F16K 31/02* (2013.01); *F16K 31/0655* (2013.01); *F16K 31/0675* (2013.01); *H01F 7/128* (2013.01)

(58) Field of Classification Search
CPC . F16K 31/02; F16K 31/0655; F16K 31/0675; H01F 7/128

USPC ........... 251/129.15; 335/279, 281; 310/12.24, 310/12.26, 14
See application file for complete search history.

(56) References Cited

U.S. PATENT DOCUMENTS 4,750,704 A      6/1988   Brundage
6,309,030 B1 *  10/2001   Feigel ........................ 303/113.1
(Continued)

FOREIGN PATENT DOCUMENTS

| CN | 101324289 A | 12/2008 |
|----|-------------|---------|
| CN | 101324290 A | 12/2008 |
| CN | 101405172 A | 4/2009  |
| CN | 101555958 A | 10/2009 |
| CN | 101737550 A | 6/2010  |
| JP | 9 210240    | 8/1997  |
| TW | 200916681 A | 4/2009  |

OTHER PUBLICATIONS

International Search Report Issued Aug. 2, 2011 in PCT/JP11/64273 Filed Jun. 22, 2011.

(Continued)

*Primary Examiner* — Matthew W Jellett
(74) *Attorney, Agent, or Firm* — Oblon, McClelland, Maier & Neustadt, L.L.P.

(57) ABSTRACT

A solenoid valve. In a solenoid section forming part of the solenoid valve, a sleeve is provided on the inner circumferential side of a bobbin around which a coil is wound. This sleeve is formed from magnetic material and includes a cylindrical section and a flange section formed at a lower end of the cylindrical section. At an upper end of the cylindrical section, a tapered section is formed in which an outer circumferential face is recessed in the radially inward direction. The tapered section is arranged facing and in close contact with the outer circumferential face of a fixed core such that the magnetic flux density in the tapered section increases when the solenoid section is excited.

9 Claims, 6 Drawing Sheets

(56) References Cited

U.S. PATENT DOCUMENTS

| | | | |
|---|---|---|---|
| 6,695,284 B2 * | 2/2004 | Isobe et al. | 251/129.15 |
| 6,752,374 B2 * | 6/2004 | Miyamoto et al. | 251/129.15 |
| 6,877,717 B2 * | 4/2005 | Collins et al. | 251/129.15 |
| 7,150,447 B2 * | 12/2006 | Kondo | 251/129.18 |
| 8,186,379 B2 | 5/2012 | Murayama | |
| 8,286,897 B2 * | 10/2012 | Dragone et al. | 239/585.1 |
| 8,596,609 B2 * | 12/2013 | Heyer et al. | 251/129.05 |
| 8,632,050 B2 * | 1/2014 | Stoeckel et al. | 251/129.15 |
| 2006/0017033 A1 | 1/2006 | Voss | |
| 2007/0290581 A1 * | 12/2007 | Burnett et al. | 310/49 R |
| 2008/0308758 A1 * | 12/2008 | Fukano et al. | 251/129.15 |
| 2009/0001302 A1 * | 1/2009 | Murayama | 251/65 |
| 2010/0294966 A1 * | 11/2010 | Czimmek et al. | 251/129.15 |

OTHER PUBLICATIONS

Combined Office Action and Search Report issued Dec. 27, 2013 in Chinese Application No. 201180032634.X (With English Translation).

Combined Taiwanese Office Action and Search Report Issued Jun. 18, 2013 in Patent Application No. 100122169 (with English translation of Categories of Cited Documents).

* cited by examiner

SOLENOID VALVE

TECHNICAL FIELD

The present invention relates to a solenoid valve having a movable iron core displaceable under excitation of a solenoid, and in which a communication state of a fluid passage is switched by displacement of the movable iron core.

BACKGROUND ART

Heretofore, as disclosed for example in Japanese Laid-Open Patent Publication No. 09-210240, a solenoid valve has been used, which is connected to a fluid passage through which a pressure fluid flows, for controlling a flow rate of the pressure fluid. Such a solenoid valve is equipped with a solenoid having a wound coil, and by supply of electricity to the coil, the solenoid is excited, and a valve body is attracted and displaced, whereby a flow-through state of the fluid is controlled. In the aforementioned solenoid valve, there is a demand to enhance the excitation force in the solenoid, accompanied by a further increase in the attracting force applied to the movable iron core.

SUMMARY OF THE INVENTION

A general object of the present invention is to provide a solenoid valve, which enables the magnetic flux density in a solenoid to be increased, thereby enhancing the attractive force of a movable iron core, together with reducing the number of assembly steps and parts required to construct the solenoid valve.

The present invention is characterized by a solenoid valve in which, by attraction of a movable iron core toward a side of a fixed iron core under excitation of a solenoid, a valve plug is displaced together with the movable iron core, and a communication state of a fluid passage formed in a valve body is switched, wherein:

a cylindrical tube made of a magnetic material and which is disposed on an outer circumferential side of the movable iron core is provided in the solenoid; and an end of the tube on the side of the fixed iron core includes a narrowed portion thinly formed in a radial direction.

According to the present invention, in the solenoid valve, which is equipped with the solenoid having the movable iron core and the fixed iron core, the cylindrical tube is provided on the outer circumferential side of the movable iron core, and the narrowed portion which is thinly formed in a radial direction is provided on an end of the tube on the side of the fixed iron core.

Accordingly, when a magnetic circuit is constituted for exciting the solenoid, magnetic flux density can be increased in the narrowed portion of the tube. Together therewith, because the tube is formed from a magnetic material, spaces in the magnetic circuit, which would otherwise be generated if the tube were made of a non-magnetic material, can be eliminated, and the efficiency of the magnetic circuit can be enhanced. As a result, the attractive force applied to the movable iron core when the solenoid is excited can be increased.

The above and other objects as well as characterizing features and advantages of the present invention shall be made clear from the following explanations of preferred embodiments described in cooperation with the accompanying drawings.

DESCRIPTION OF EMBODIMENTS

Figure 1:
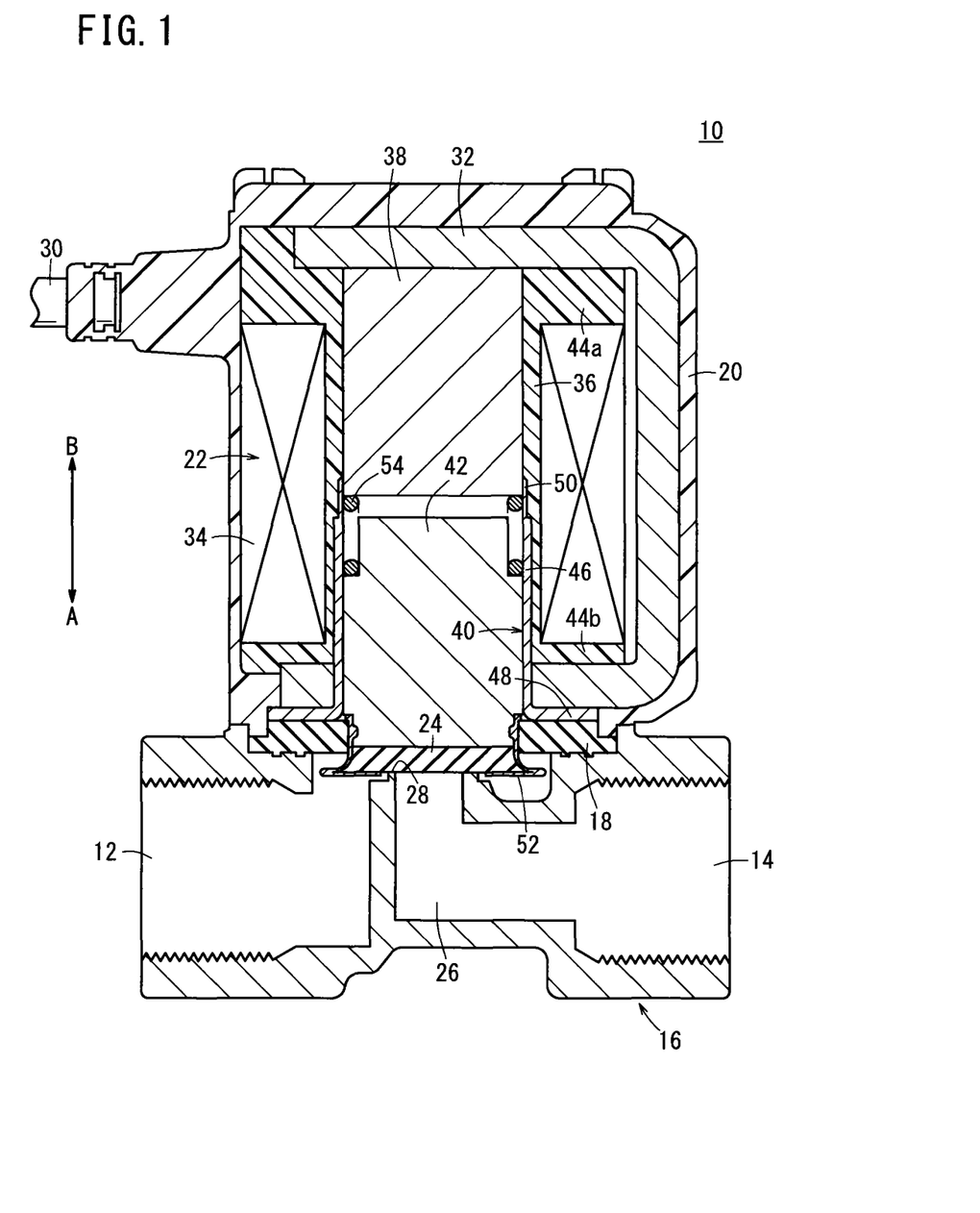
FIG. 1 is an overall cross sectional view of a solenoid valve according to a first embodiment of the present invention.

In FIG. 1, reference numeral 10 indicates a solenoid valve according to a first embodiment of the present invention.

Figure 2:
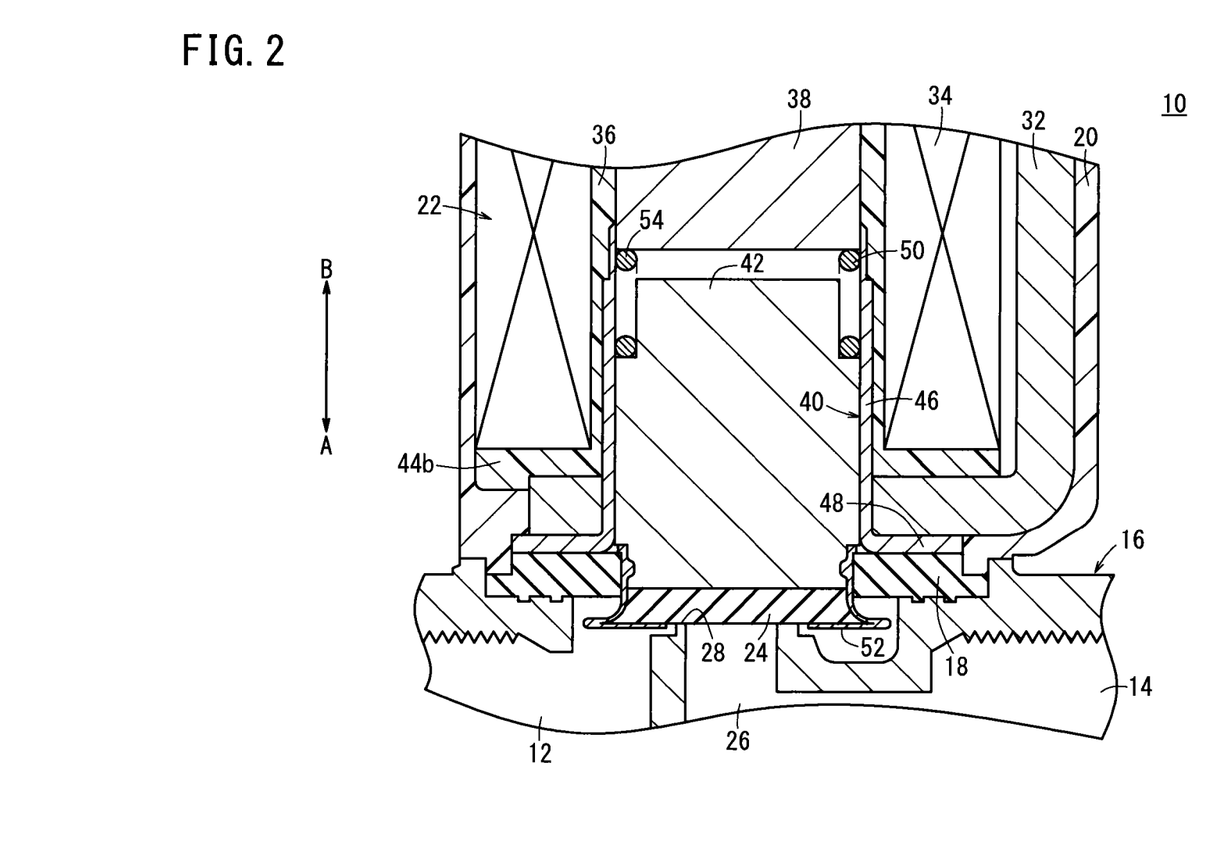
FIG. 2 is an enlarged view in the vicinity of a solenoid in the solenoid valve of FIG. 1.
Figure 3:
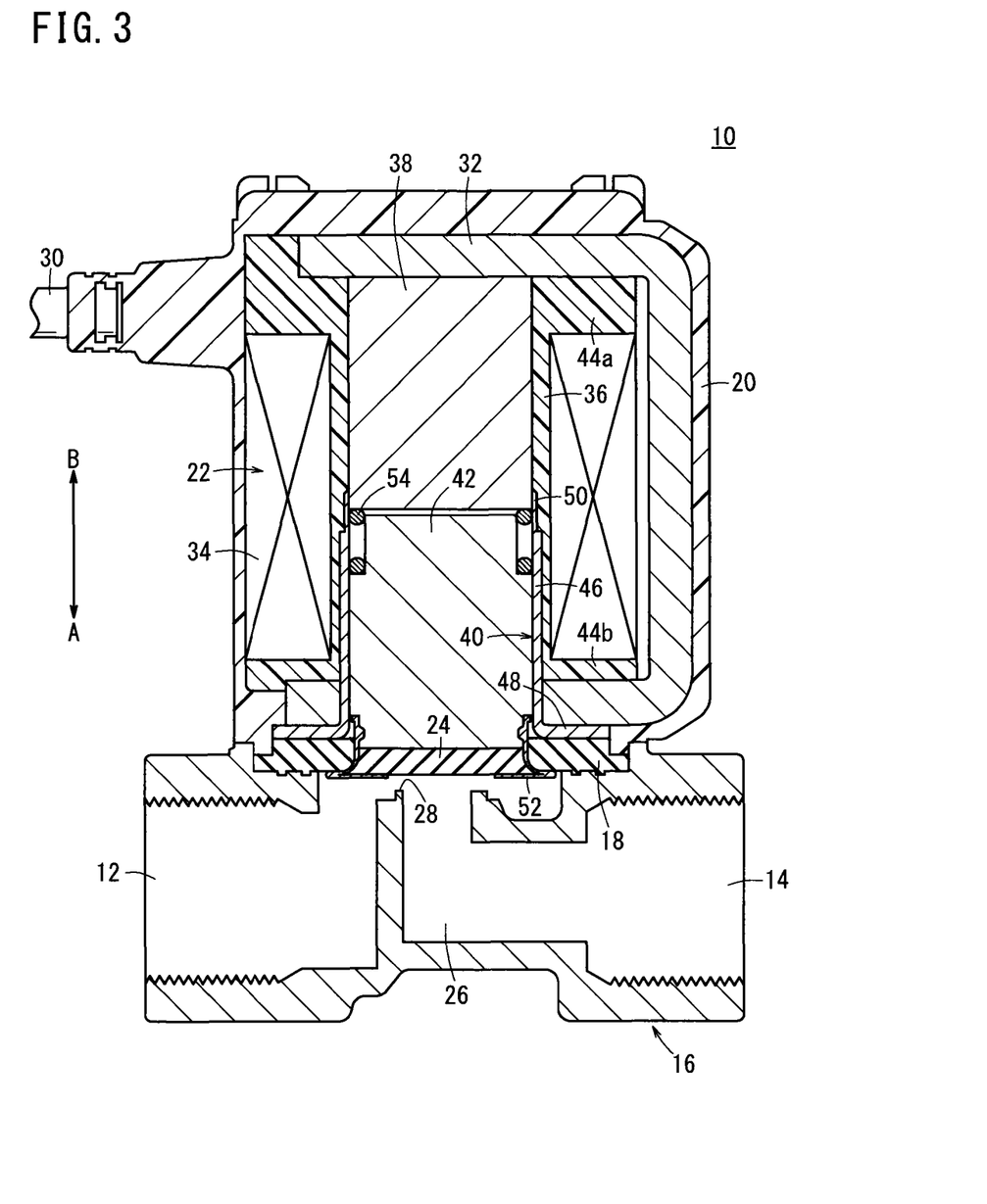
FIG. 3 is an overall cross sectional view showing a valve open state in the solenoid valve of FIG. 1.

As shown in FIGS. 1 through 3, the solenoid valve 10 includes a valve body 16 having first and second ports (fluid passages) 12, 14 for supply and discharge of a pressure fluid, a solenoid 22 disposed on an upper part of the valve body 16 through an annular seal member 18 and accommodated inside a casing 20, and a valve plug 24 for mutually switching a communication state between the first and second ports 12, 14 under excitation of the solenoid 22.

The first port 12, which opens toward the exterior, is disposed on one side surface of the valve body 16. The first port 12 is connected through piping or the like to a non-illustrated pressure fluid supply source, and a pressure fluid is supplied thereto from the pressure fluid supply source. The second port 14 is disposed on the other side surface of the valve body 16, through which the pressure fluid supplied to the first port 12 is discharged to the exterior.

Further, a communication passage 26 that communicates with the first and second ports 12, 14 is formed substantially in the center of the valve body 16, and the first port 12 and the second port 14 communicate with each other through the communication passage 26. A valve seat 28 is provided in an intermediate location in the communication passage 26, the valve seat 28 being formed to enable abutment thereon of the valve plug 24.

Furthermore, the seal member (stopper) 18 made of an elastic material is mounted on an upper part of the valve body 16, and is gripped between the casing 20 and a flange 48 of a later-described sleeve 40. Owing thereto, leakage of pressure fluid between the valve body 16 and the casing 20 can be prevented. The lower surface of the seal member 18, which confronts the valve body 16, is formed in a substantially planar shape, and in a valve open state of the valve plug 24, the seal member 18 abuts against a holder 52 (described later) that retains the valve plug 24 (see FIG. 3).

The casing 20 is formed, for example, from a resin material in a bottomed cylindrical shape, and is installed from above so as to cover the solenoid 22. A lead line 30 for supplying electrical current is connected to a side of the casing 20. More specifically, upper and side portions of the solenoid 22 are covered by the casing 20, which is formed in a bottomed cylindrical shape, whereas the lower portion thereof is covered by the valve body 16, which is disposed on the lower part of the casing 20. Thus, the solenoid 22 is in a completely covered state without being exposed to the exterior.

The solenoid 22 is constituted from a frame 32, which is arranged in the interior of the casing 20 and abuts against an inner wall surface of the casing 20, a bobbin 36 provided in the frame 32 on which a coil 34 is wound, a fixed iron core 38 retained with respect to the frame 32, the sleeve (tube) 40 disposed coaxially with the fixed iron core 38, and a movable iron core 42, which is arranged in the interior of the sleeve 40 and is urged in a direction (the direction of the arrow A) to separate away from the fixed iron core 38.

The frame 32 is formed with a U-shape in cross section, for example, from a metal material, so as to surround an upper end and a lower end of the bobbin 36, and is connected electrically to the lead line 30 through the casing 20.

The bobbin 36 is equipped with a pair of flanges 44a, 44b on upper and lower ends thereof, which are expanded in diameter in a radial outward direction. The coil 34 is wound on the bobbin 36 and retained between the flanges 44a, 44b.

The fixed iron core 38 is formed in a substantially cylindrical columnar shape from a metal material, for example, such as pure iron or the like, and is inserted through the interior of the bobbin 36. Additionally, the upper end of the fixed iron core 38 is connected to the frame 32, for example by welding, whereas the lower end of the fixed iron core 38 is formed in a planar shape perpendicular to the axis of the fixed iron core 38.

The sleeve 40 is formed from a magnetic material and comprises a cylindrical section 46 provided on the inner circumferential side of the bobbin 36, and the flange 48 formed on the lower end of the cylindrical section 46, which is expanded in diameter in a radial outward direction. The cylindrical section 46 is arranged on the side of the fixed iron core 38 (in the direction of the arrow B), whereas the flange 48 is arranged on the side of the valve body 16 (in the direction of the arrow A). The sleeve 40 is formed, for example, by press-forming a plate material having a substantially constant thickness.

A portion of the cylindrical section 46 is inserted through and along the inner circumferential side of the bobbin 36, and the movable iron core 42 is disposed displaceably in the interior of the cylindrical section 46. The cylindrical section 46 is formed with a substantially constant inner diameter, and a slight clearance is provided between the cylindrical section 46 and the outer circumferential surface of the movable iron core 42 that is inserted through the interior of the cylindrical section 46.

Further, on the upper end of the cylindrical section 46, a tapered portion (narrowed portion) 50 is formed due to the outer circumferential surface being recessed in a radial inward direction. The tapered portion 50 is formed with a thickness of roughly ⅓ to location apart from the tapered portion 50, whereas the inner circumferential surface thereof is arranged to face toward the lower end vicinity of the fixed iron core 38. More specifically, the distal end of the cylindrical section 46 that constitutes the sleeve 40 is formed to be thinner in comparison with other parts of the cylindrical section 46. The tapered portion 50 is formed, for example, simultaneously when the sleeve 40 is fabricated by press-forming. Stated otherwise, on the cylindrical section 46, only the outer circumferential surface of the tapered portion 50 is reduced in diameter, whereas the inner circumferential surface is formed with a substantially uniform diameter along the axial direction (the direction of arrows A and B).

In addition, the inner circumferential surface of the tapered portion 50 is joined, for example by welding, with respect to the outer circumferential surface of the fixed iron core 38. Owing thereto, the fluid flow between the sleeve 40 and the fixed iron core 38 is blocked.

The sleeve 40 is not limited to being coupled with respect to the fixed iron core 38, and for example, the fixed iron core 38 may be lightly press-inserted with respect to the inner circumferential surface of the sleeve 40. More specifically, the method of connecting the sleeve 40 and the fixed iron core 38 is not particularly limited, and any method may be used insofar as flow of fluid can be blocked between the sleeve 40 and the fixed iron core 38.

On the other hand, the flange 48 is bent substantially at a right angle with respect to the cylindrical section 46, and is gripped between the seal member 18 and the frame 32.

The movable iron core 42 is formed, for example, from a magnetic material in a cylindrical columnar shape, and the holder 52 that retains the valve plug 24 is installed on the lower end thereof. The holder 52 is formed in a hollow shape and expands in diameter in a radial outward direction from the outer circumference of the movable iron core 42, such that the valve plug 24 is gripped and held between the holder 52 and an end surface of the movable iron core 42. Further, the outer edge portion of the holder 52 is arranged to face toward the seal member 18.

The valve plug 24, for example, is formed in a disk shape from an elastic material such as rubber or the like, and is retained on the lower end of the movable iron core 42 through the holder 52. Additionally, the valve plug 24 is disposed such that, upon displacement of the movable iron core 42, the valve plug 24 can be seated with respect to the valve seat 28 of the valve body 16.

A spring 54 is interposed between the movable iron core 42 and the fixed iron core 38. An elastic force of the spring 54 urges the movable iron core 42 including the valve plug 24 toward the side of the valve seat 28 (in the direction of the arrow A).

The solenoid valve 10 according to the first embodiment of the present invention is constructed basically as described above. Next, operations and effects of the solenoid valve 10 will be explained. FIG. 1 shows an OFF state, which is a non-excited condition in which current is not supplied to the coil 34, the movable iron core 42 is displaced toward the side of the valve seat 28 (in the direction of the arrow A) by the elastic force of the spring 54, the valve plug 24 is seated on the valve seat 28, and communication between the first port 12 and the second port 14 is blocked.

In such an OFF state, by activating a non-illustrated electrical power supply to energize the coil 34, the coil 34 becomes excited, and under excitation thereof, the movable iron core 42 is attracted toward the side of the fixed iron core 38 (in the direction of the arrow B).

At this time, although a closed magnetic circuit is created in which magnetism generated by the coil 34 passes through the fixed iron core 38, the frame 32, the sleeve 40, and the movable iron core 42, and returns again to the fixed iron core 38, the magnetic flux density is increased at the tapered portion 50 of the sleeve 40, which is formed in the shape of a thin plate, and along therewith, the magnetic flux density on the side of the movable iron core 42 can be increased. As a result, even in the case that the sleeve 40 is provided, which is made of a magnetic material, and the magnetic circuit is formed as a closed circuit, a sufficient attractive force for the movable iron core 42 can be obtained, and the movable iron core 42 can be displaced rapidly toward the side of the fixed iron core 38.

Further, since the sleeve 40 is formed from a magnetic material, spaces are not formed in the magnetic circuit, as in the case of a non-magnetic body, and thus the efficiency of the magnetic circuit can be improved, and the attractive force applied to the movable iron core 42 can be increased.

Consequently, an ON state is switched to, in which the valve plug 24 is separated by a predetermined distance away from the valve seat 28, and the first port 12 and the second port 14 are placed in communication with each other through the communication passage 26. As a result, the pressure fluid supplied from the first port 12 passes through the gap between the valve plug 24 and the valve seat 28, and is supplied via the second port 14 to a non-illustrated fluid operated device.

Further, the holder 52 is raised together with the valve plug 24, and by abutment of the outer edge thereof with respect to the seal member 18, further upward displacement along the axial direction (in the direction of the arrow B) is limited. Thus, together with controlling the degree of opening of the valve plug 24, because the seal member 18 is formed from an elastic material, shocks that occur upon opening of the valve are absorbed, and impact noises due to such shocks, and wear due to abutment can be prevented.

Stated otherwise, by abutment of the holder 52 that is connected to the lower end of the movable iron core 42 against the elastic seal member 18, displacement of the movable iron core 42 toward the side of the fixed iron core 38 (in the direction of the arrow B) is limited, and since the upper end of the movable iron core 42 does not come into abutment against the lower end of the fixed iron core 38, it is possible to prevent wear and impact noises, which would be of concern if abutment against the fixed iron core 38 were to occur. More specifically, the seal member 18 is equipped to provide dual functionality, including both a sealing function for maintaining fluidtightness between the valve body 16 and the casing 20, as well as a stopper function for controlling the amount of displacement in the upward direction (the direction of the arrow B) of the valve plug 24 and the movable iron core 42 to which the valve plug 24 is connected.

On the other hand, by suspending supply of power to the coil 34 and placing the solenoid 22 including the coil 34 in a non-excited state, the attractive force on the movable iron core 42 is deenergized, whereupon the movable iron core 42 is pressed toward the side of the valve seat 28 (in the direction of the arrow A) by the elastic force of the spring 54. In addition, by seating of the valve plug 24 on the valve seat 28, the OFF state is brought about in which communication is blocked between the first port 12 and the second port 14.

In the foregoing manner, with the first embodiment, in the sleeve 40 that makes up the solenoid 22, by providing the tapered portion 50 on the end of the cylindrical section 46, which is made partially thin and smaller in cross sectional area, the magnetic flux density can be increased when the solenoid 22 is excited. Stated otherwise, by narrowing the cylindrical section 46 on the sleeve 40 to be partially tapered, upon excitation of the solenoid 22, the magnetic flux density can be increased. Further, because the sleeve 40 is formed from a magnetic material, spaces in the magnetic circuit, which otherwise would occur if the sleeve 40 were made of a non-magnetic material, can be eliminated, and the efficiency of the magnetic circuit, which is constituted to include the sleeve 40 therein, can be enhanced.

As a result, the attractive force on the movable iron core 42 when the solenoid 22 is excited can be increased, and together therewith, the movable iron core 42 and the valve plug 24 can be displaced more rapidly.

Further, in comparison with the solenoid valve of the conventional art, in which the sleeve 40, which is made of a magnetic material, and a separate blocking member, which is disposed in the interior of the sleeve 40 for blocking flow of fluid from passing between the sleeve 40 and the fixed iron core 38, are provided as separate respective elements, in the present invention, because the same effects can be achieved by a single sleeve 40, the number of parts in the solenoid 22 can be decreased, and the manufacturing steps for fabricating the solenoid valve 10 can be shortened.

Furthermore, since the tapered portion 50 on the sleeve 40 is connected to the outer circumferential surface on the lower end of the fixed iron core 38, fluid that enters into the interior of the sleeve 40 is prevented from flowing toward the side of the fixed iron core 38 (in the direction of the arrow B), along with preventing leakage of fluid through the solenoid 22 to the exterior of the solenoid valve 10.

Further, because the solenoid 22 is covered on upper and side portions thereof by the casing 20, which is formed in a bottomed cylindrical shape from a resin material, it is unnecessary to provide a seal member between the solenoid 22 and the fixed iron core 38, the number of parts can be reduced, and a low cost solenoid valve 10 can be constructed, together with enabling fluidtightness to be maintained in the interior of the casing 20 in which the solenoid 22 is accommodated.

Figure 4:
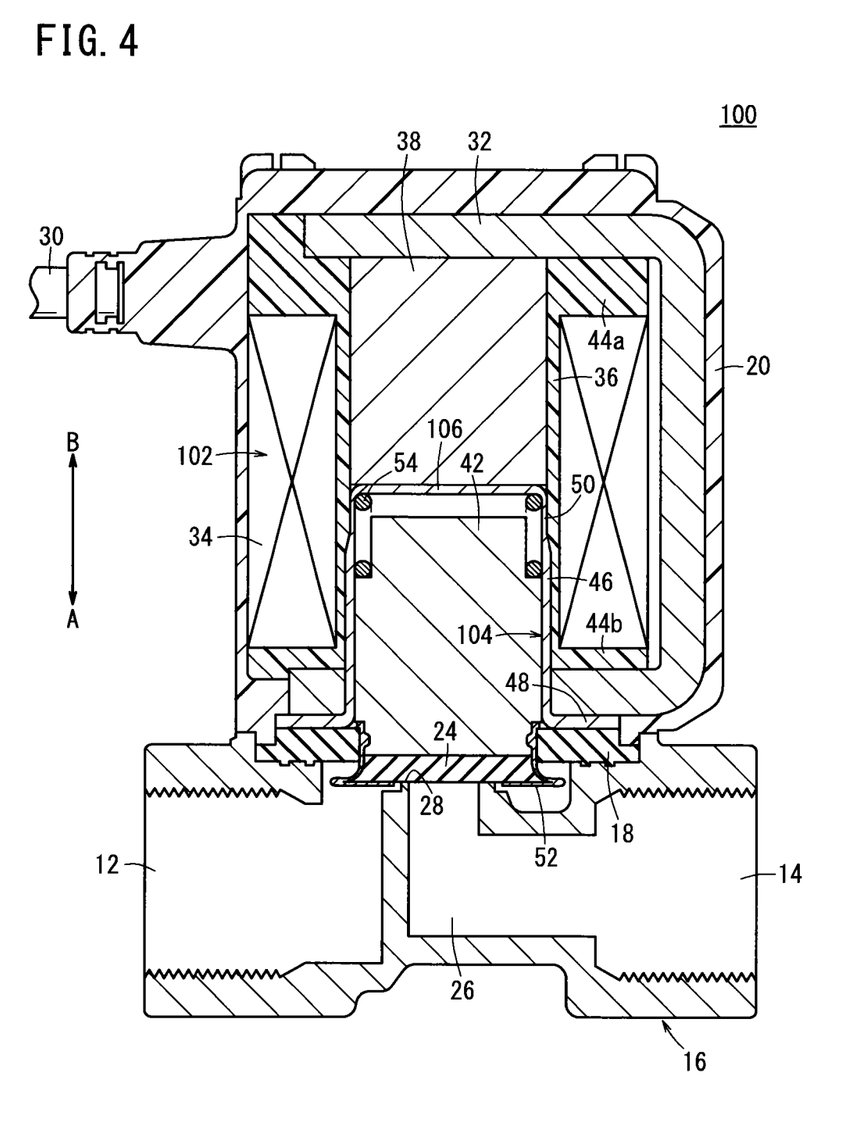
FIG. 4 is an overall cross sectional view of a solenoid valve according to a second embodiment of the present invention.
Figure 5:
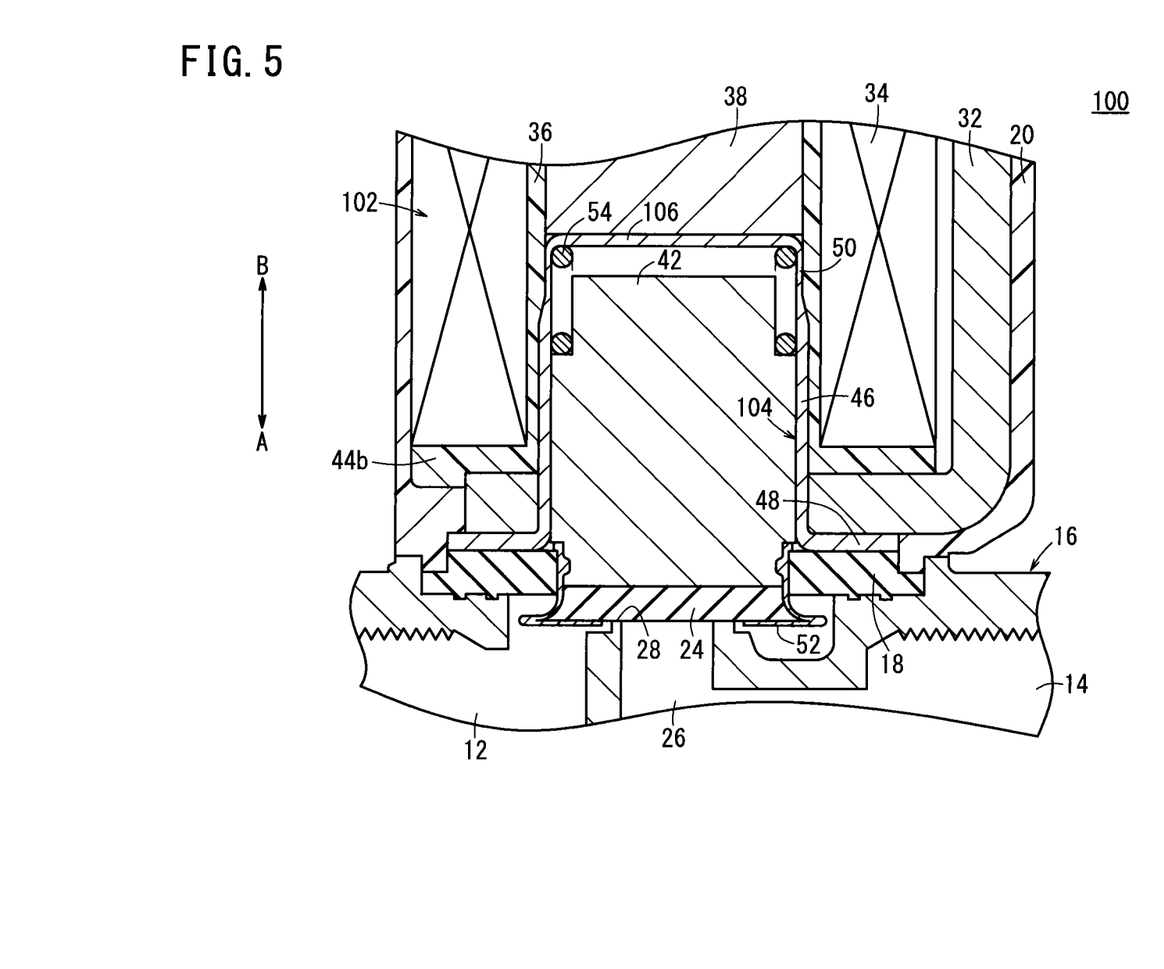
FIG. 5 is an enlarged view in the vicinity of a solenoid in the solenoid valve of FIG. 4.
Figure 6:
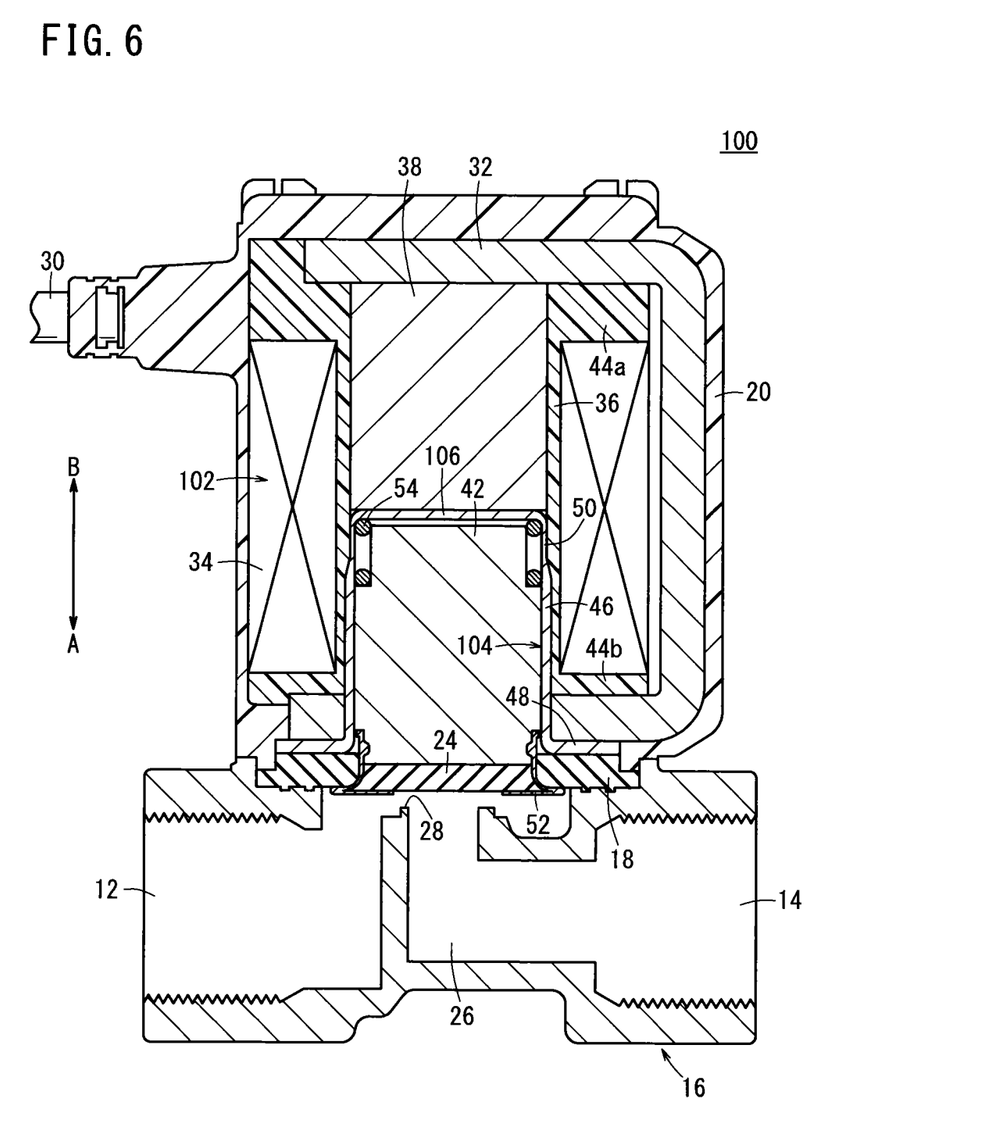
FIG. 6 is an overall cross sectional view showing a valve open state in the solenoid valve of FIG. 4.

Next, a solenoid valve 100 according to a second embodiment is shown in FIGS. 4 through 6. Constituent elements thereof, which are the same as those of the solenoid valve 10 according to the above-described first embodiment, are designated using the same reference numerals, and detailed descriptions of such features are omitted.

The solenoid valve 100 according to the second embodiment differs from the solenoid valve 10 according to the first embodiment, in that a sleeve 104, which constitutes part of the solenoid 102, is formed in a bottomed cylindrical shape, and a bottom wall portion (sealing member) 106 of the sleeve 104 is joined to the fixed iron core 38.

The sleeve 104 is made up from the cylindrical section 46 having the tapered portion 50 at the distal end thereof, the flange 48 formed on the lower end of the cylindrical section 46, and the bottom wall portion 106, which is formed in covering relation to the tapered portion 50. The bottom wall portion 106 is formed perpendicular to the axis of the cylindrical section 46, and locations apart from the flange 48 and the tapered portion 50 on the cylindrical section 46 are formed with substantially the same thickness. In other words, the sleeve 104 is formed in a cup-like shape with a U-shape in cross section.

In addition, the bottom wall portion 106 of the sleeve 104 is inserted in the interior of the bobbin 36 on the side of the fixed iron core 38 (in the direction of the arrow B), and the lower end surface of the fixed iron core 38 and the bottom wall portion 106 of the sleeve 104 are joined to each other, for example, by welding or the like.

Further, in the interior of the sleeve 104, the spring 54 is interposed between the bottom wall portion 106 and the movable iron core 42, and the movable iron core 42 is urged toward the side of the valve seat 28 (in the direction of the arrow A) by the elastic force of the spring 54.

In the foregoing manner, with the second embodiment, the sleeve 104 is formed as a bottomed cylinder, and by integrally joining the bottom portion thereof with respect to the lower end of the fixed iron core 38, a decrease in the magnetic characteristics when the solenoid 102 including the sleeve 104 is excited can be prevented. Owing thereto, it is possible to suppress a decrease in the attractive force applied with respect to the movable iron core 42. Further, in the sleeve 104 that constitutes part of the solenoid 102, by providing the tapered portion 50 on the distal end of the cylindrical section 46, and forming the distal end to be partially thin and smaller in cross sectional area, the magnetic flux density produced when the solenoid 102 is excited can be increased. Further, since the sleeve 104 is formed from a magnetic material, spaces which otherwise would occur in the event that the sleeve 104 were made of a non-magnetic material can be eliminated, and the efficiency of the magnetic circuit, which is formed to include the sleeve 104, can be enhanced.

As a result, the attractive force of the movable iron core 42 that occurs when the solenoid 102 is excited can be increased, accompanied by more rapid displacement of the movable iron core 42 and the valve plug 24.

Further, since the sleeve 104 is formed in a bottomed cylindrical shape having the bottom wall portion 106 on the side of the fixed iron core 38, even in the case that the sleeve 104 is not connected to the fixed iron core 38 by welding or the like, fluid that enters into the interior of the sleeve 104 can reliably be prevented from flowing (in the direction of the arrow B) to the side of the fixed iron core 38. Stated otherwise, leakage of fluid through the solenoid 102 to the exterior of the solenoid valve 100 can easily be prevented.

Furthermore, as a result of forming the sleeve 104 in a bottomed cylindrical shape, the fixed iron core 38 is prevented from contacting the pressure fluid that flows through the valve body 16. Owing thereto, for example, even in the case that the pressure fluid is a liquid and the fixed iron core 38 is made of pure iron, corrosion of the fixed iron core 38 can reliably be prevented, and compared to a case of forming the fixed iron core 38 from stainless steel in order to prevent corrosion thereof, manufacturing costs can be decreased.

The solenoid valve according to the present invention is not limited to the above described embodiments, and various other structures may be adopted as a matter of course without deviating from the essence and gist of the present invention.

The invention claimed is:

1. A solenoid valve comprising:
   a fixed iron core that is cylindrical in shape and having a first radius along an entire length of the fixed iron core, the fixed iron core being positioned in a solenoid;
   a movable iron core that is cylindrical in shape and having the first radius, the movable iron core positioned in the solenoid and the movable iron core moves toward the fixed iron core when the movable iron core is under excitation of the solenoid;
   a valve plug that is displaced together with the movable iron core when the movable iron core is under excitation of the solenoid;
   a valve body that is switched when the movable iron core is under excitation of the solenoid, a communication state of a fluid passage formed in the valve body when the vale body is switched; and
   a cylindrical tube made of a magnetic material, the cylindrical tube including a first portion a narrowed portion and a bottom wall portion, wherein
   the first portion of the cylindrical tube having a first inner radius that is larger than the first radius, the first portion being of a first uniform thickness along the length of the first portion, and the first portion being disposed in the solenoid and on an outer circumferential side of the movable iron core,
   the narrowed portion of the cylindrical tube having a second inner radius that is larger than the first radius and equal to the first inner radius of the first portion, the narrowed portion being of a second uniform thickness along the length of the narrowed portion that is smaller than the first uniform thickness, and
   the bottom wall portion is perpendicular to the narrowed portion and is positioned between the fixed iron core and the movable iron core.

2. The solenoid valve according to claim 1, wherein an outer circumferential surface of the narrowed portion has a radius that is smaller than a radius of an outer circumferential surface of the first portion.

3. The solenoid valve according to claim 1, wherein the narrowed portion is positioned between the bottom wall portion and the first portion of the cylindrical tube, and the solenoid valve further comprises:
   a flange that is connected to the first portion and positioned at an end of the cylindrical tube, the flange being of the first uniform thickness along the length of the flange;
   a sealing member that is positioned such that the flange is between the narrowed portion and the sealing member, wherein
   the length of the flange is perpendicular to the narrow portion and parallel to the sealing member.

4. The solenoid valve according to claim 1, wherein the cylindrical tube surrounds the movable iron core.

5. The solenoid valve according to claim 1, wherein the fixed iron core contains iron.

6. The solenoid valve according to claim 1, wherein the solenoid is covered by a casing that includes a resin material.

7. The solenoid valve according to claim 1, wherein
   the valve plug is disposed through a holder on an end of the movable iron core, and
   the holder abuts against a stopper made of an elastic material and is disposed on the valve body, at a time of valve-opening when the valve plug is moved toward the fixed iron core.

8. The solenoid valve according to claim 1, wherein
   the valve plug includes a bottom surface that is perpendicular to the length of the fixed iron core,
   the valve body includes a valve seat that forms a communication passage that connects a first fluid passage to a second fluid passage when the movable iron core is in the open communication state and the valve plug and does not abut the valve seat, and
   the communication passage has a passage radius that is smaller than a radius of the bottom surface of the valve plug.

9. The solenoid valve according to claim 1, wherein the bottom wall portion is connected to the narrowed portion.

* * * * *